United States Patent [19]

Jin et al.

[11] 4,049,747

[45] Sept. 20, 1977

[54] CROSSLINKED VINYL HALIDE POLYMERS AS FLAME RETARDANT ADDITIVES FOR THERMOPLASTICS

[75] Inventors: Jung Il Jin, Irvington; Paul Kraft, Spring Valley, both of N.Y.

[73] Assignee: Stauffer Chemical Company, Westport, Conn.

[21] Appl. No.: 741,903

[22] Filed: Nov. 15, 1976

Related U.S. Application Data

[60] Division of Ser. No. 512,773, Oct. 7, 1974, Pat. No. 4,022,849, which is a division of Ser. No. 395,684, Sept. 10, 1973, abandoned, which is a continuation-in-part of Ser. No. 108,632, Jan. 21, 1971, Pat. No. 3,780,141.

[51] Int. Cl.$^2$ ............................................. C08L 75/00
[52] U.S. Cl. ..................... 260/859 PV; 260/23 R; 260/23 XA; 260/23.7 H; 260/28.5 A; 260/17 R; 260/30.6 R; 260/31.8 M; 260/45.7 R; 260/45.7 P; 260/45.75 K; 260/45.75 B; 260/45.8 N; 260/859 R; 260/862; 260/873; 260/857 UN; 260/876 R; 260/890; 260/891; 260/895; 260/897 C; 260/898; 260/899; 260/901; 260/DIG. 24

[58] Field of Search ................ 260/859 PV, 2.5 BE

[56] References Cited

U.S. PATENT DOCUMENTS

| 2,606,162 | 8/1952 | Coffey | 260/859 PV |
|---|---|---|---|
| 3,200,089 | 8/1965 | Landler | 260/859 PV |
| 3,267,051 | 8/1966 | Landler | 260/859 PV |
| 3,673,059 | 6/1972 | Brandt | 260/859 PV |

FOREIGN PATENT DOCUMENTS

| 47-19186 | 6/1972 | Japan | 260/859 PV |
|---|---|---|---|

*Primary Examiner*—Paul Lieberman
*Attorney, Agent, or Firm*—Richard P. Fennelly

[57] ABSTRACT

There are disclosed fire retardant polyblends comprising thermoplastic polymers intimately admixed with a crosslinked copolymer of a vinyl halide, preferably a crosslinked vinyl chloride copolymer. These fire retardant polyblends may be utilized in a variety of coating, impregnating and especially molding applications wherein it is desired to provide fire retardancy to the resulting end product.

13 Claims, No Drawings

4,049,747

CROSSLINKED VINYL HALIDE POLYMERS AS FLAME RETARDANT ADDITIVES FOR THERMOPLASTICS

RELATED APPLICATION

This application is a division of Ser. No. 512,773 filed Oct. 7, 1974, now U.S. Pat. No. 4,022,849, which is a division of Ser. No. 395,684, filed Sept. 10, 1973, now abandoned, which is a C-I-P of Ser. No. 108,632 filed Jan. 21, 1971, now U.S. Pat. No. 3,780,141.

Background of the invention

As is known to those skilled in the art, the so-called burning thermoplastics which include, for example, polystyrene, the polyolefins, polymethyl methacrylate and the ABS resins, all possess the undesirable property, upon being ignited, of continuing to burn until substantially consumed. Accordingly, these hard and, in many instances, optically clear materials which are widely employed for the preparation of a broad range of consumer and industrial articles cannot, ordinarily, be used in many applications involving their use in building interiors or in products which will be subjected to prolonged exposure to high temperatures. Thus, the burning thermoplastic fail to display fire or flame retardant properties which would, otherwise, permit them to either meet the standards set by various building codes or to be safely employed in place of more costly materials.

Prior attempts to provide fire retardant compositions from these burning thermoplastics have involved their blending with a variety of extraneous additives such, for example, as antimony oxides, halogenated paraffins, nalogenated hydrocarbons and low molecular weight phosphate esters. Many of these additives, such as antimony trioxide, are quite expensive while, in general, their effective utilization requires their presence in rather high concentrations which adversely effect the physical properties of the treated polymers. Thus, the inherent hardness and, in some instances, the clarity of the thermoplastic polymers are particularly prone to deterioration in the presence of high concentrations of these additives which are necessary in order to achieve a self-extinguishing polymer composition.

It is, therefore, the prime object of this invention to provide novel fire retardancy additives which can be used, per se, as fire retardant materials or which can, preferably, be admixed with burning thermoplastics so as to yield polyblends characterized by their excellent fire retardant properties which are achieved without any serious diminution of the physical properties of such blends. Various other objects and advantages of this invention will be apparent from the disclosure thereof which follows hereinafter.

Technical Disclosure of the Invention

It has now been found that crosslinked copolymers of the vinyl halides, particularly of vinyl chloride, can be blended with burning thermoplastics so as to yield fire retardant polyblends which are devoid of any detrimental effects upon their physical properties. Moreover, it is truly surprising and advantageous to find that the polyblends resulting from the process of this invention display an outstanding degree of compatibility with various burning thermoplastics. Thus, it is well known to those skilled in the art that physical blends of two or more polymers are generally characterized by their inherently poor mixing.

It should be noted, at this point, that the use of the term "crosslinked" in describing the novel fire retardant copolymers of this invention will indicate to those skilled in the art that they possess a highly intermeshed, three-dimensional configuration or network rather than a simple linear or branched structure of the type found in non-crosslinked copolymers. Thus, such "crosslinked" polymers may be further characterized by the fact that they will not lose more than about 20% of their total weight upon being extracted with methanol in a Soxlet extractor. In addition, the use in this disclosure of the term "copolymer" is meant to denote a polymer derived from two, three or more distinct monomer species.

The novel fire retardant additives of this invention are thus seen to comprise crosslinked copolymers of:

1. One or more vinyl halides selected from the group consisting of vinyl chloride, vinyl bromide and vinyl fluoride with the use of vinyl chloride being preferred because of its lower cost and more wide spread commercial availability; and, 2. one or more polyfunctional ethylenically unsaturated monomers, i.e. one or more monomers containing two or more polymerizable, ethylenically unsaturated bonds including, for example, allyl methacrylate, divinyl benzene, diethylene glycol dimethacrylate, ethylene glycol dimethacrylate, trimethylolpropane trimethacrylate, diallyl adipate, 2-vinyl oxyethyl ether, methylene-bis-acrylamide, diethylene glycol diacrylate, ethylene glycol diacrylate, divinyl ether, dially fumarate, diallyl phthalate, divinyl sulfone, divinyl carbitol, butylene dimethacrylate, trimethylene glycol diacrylate, butylene glycol diacrylate, pentamethylene glycol diacrylate, glyceryl triacrylate, octylene glycol diacrylate, trimethylene propane triacrylate, the tetraacrylate ester of pentaerythritol and diallyl phosphonates such as ethyl diallylphosphonate. Optimum results are, however, obtained by the use of allyl methacrylate since its use leads to a higher degree of conversion of the vinyl chloride monomer to the form of polymeric moieties as well as a more extensive degree of crosslinking as indicated by the presence of little, if any, methanol extractable residues in the resulting crosslinked copolymer.

The crosslinked copolymeric fire retardant additives of this invention may also, if desired, contain one or more optional monovinyl, i.e. monoethylenically unsaturated, comonomers. These optional comonomers can include: vinylidene halides such as vinylidene chloride, vinylidene bromide and vinylidene fluoride; alpha-olefins such as ethylene, propylene and butylene; vinyl esters of carboxylic acids such as vinyl acetate, vinyl butyrate, and vinyl stearate; the $C_1$–$C_{20}$ alkyl esters of acrylic and methacrylic acid such as methyl methacrylate, bromomethyl methacrylate, methyl acrylate, ethyl acrylate, butyl acrylate, 2-ethylhexyl acrylate and lauryl acrylate; aryl, halo- and nitro-substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide; vinyl pyrrolidones such as N-vinyl-2-pyrrolidone; vinyl aryl compounds such as styrene and alpha-methyl styrene; nitriles of ethylenically unsaturated carboxylic acids such as acrylonitrile, methacrylonitrile and α-chloroacrylonitrile; $C_1-C_{20}$ alkyl vinyl ethers such as methyl vinyl ether, ethyl vinyl ether and stearyl vinyl ether; and, vinyl and allyl phosphonates such as bis(beta-chloroethyl) vinylphosphonate and bis(beta-chloroethyl) allylphosphonate. Preferred for use as optional comonomers are the vinylidene halides, particularly vinylidene chloride, and the vinyl and allyl phosphonates.

With respect to proportions, the crosslinked vinyl halide copolymers applicable for use as fire retardant additives for preparing polyblends with burning thermoplastics may contain from about 50 to 99 and preferably about 60 to 98%, by weight, of one or more of the above described vinyl halides; from about 1 to 50 and preferably about 2 to 40%, by weight, of one or more of the above described polyfunctional ethylenically unsaturated monomers; and, from 0 to about 49%, by weight, of one or more of the above described optional monovinyl comonomers.

The above described copolymers may be prepared by means of any convenient, free radical initiated polymerization technique known to those skilled in the art including such procedure as suspension, emulsion and solution polymerization.

Thus, in preparing these crosslinked vinyl halide copolymers by means of a suspension polymerization technique, the reaction is conducted in an aqueous medium containing from about 0.01 to 10%, as based on the total weight of the monomer mixture, of a suspension agent such, for example as gelatin, starch, hydroxymethyl cellulose, hydroxyethyl cellulose, hydroxypropyl cellulose, carboxymethyl cellulose, talc, clay, polyvinyl alcohol and the like. As a catalyst for the polymerization, one may use from about 0.01 to 5%, as based on the total weight of the monomer mixture, of a monomer soluble azo or peroxide catalyst such, for example, as azobisisobutyronitrile, lauroyl peroxide, benzoyl peroxide, isopropylperoxy dicarbonate, t-butyl peroxypivalate and the like.

Polymerization may ordinarily be initiated by heating the system to a temperature in the range of from about 45° to 100° C. for a period of from about 4 to 24 hours with agitation being applied throughout the course of the reaction. The resulting product will comprise an aqueous suspension of the desired copolymer which will be in the form of particulate solids having a resin solids content in the range of from about 10 to 30%, by weight. These copolymer particles will have a particle size in the range of from about 10 to 500 microns with a range of from about 10 to 50 microns being preferred when these copolymers are to be used as fire retardant additives for preparing polyblends with burning thermoplastics.

In preparing these copolymers by means of an emulsion polymerization procedure, the selected monomers are dispersed in an aqueous medium containing from about 0.01 to 10%, by weight of the monomers, of one or more anionic, non-ionic or cationic emulsifiers such, for example, as the alkyl carboxylic acid salts, the alkyl sulfate salts, the alkyl sulfonate salts, the alkyl phosphate salts, the alkyl sulfosuccinate salts, the alkyl aryl ether alcohols and the alkyl aryl polyether sulfate salts. The aqueous monomer emulsion is then heated for about 4 to 24 hours at a temperature of from about 25° to 100° C. in the presence of from about 0.01 to 5%, by weight of the monomer mixture, of a water soluble free radical initiating catalyst such, for example, as ammonium, sodium or potassium persulfate, hydrogen peroxide or a redox system comprising a mixture of a presulfate with an alkali metal bisulfite, thiosulfate or hydrosulfite.

And, in preparing these copolymer by means of a solution polymerization procedure, the selected monomers are first dissolved in an organic solvent such, for example, as benzene, toluene, cyclohexanone, acetone, tetrahydrofuran, trichloroethylene, dimethylformamide or dimethylsulfoxide. The resulting solution is then heated for from about 4 to 24 hours at a temperature of from about 30° to 100° C. in the presence of a monomer soluble azo or peroxide catalyst as exemplified by the compounds listed, hereinabove, in describing the suspension polymerization process.

Specific crosslinked vinyl halide copolymer compositions which have been found to provide particularly good results as additives for the preparation of fire retardant, thermoplastic polymer compositions, i.e. polyblends, are a 95:5 vinyl chloride:allyl methacrylate copolymer, a 90:10 vinyl chloride-allyl methacrylate copolymer and a 90:10 vinyl bromide:allyl methacrylate copolymer.

In all cases, the novel crosslinked vinyl halide copolymer additives of this invention have been found to provide blends with thermoplastic polymers which are characterized by their outstanding fire retardancy, their ease of blending and their retention of physical properties such as hardness, tensile and impact strength. As used in this disclosure, the term "fire retardant" or "flame retardant" is intended to refer to that particular property of a material which provides it with a degree of resistance to ignition and burning. Thus, a fire or flame retardant composition is one which has a low level of flammability and flame spread.

The thermoplastic polymers which can be used in preparing polyblends with the novel crosslinked vinyl halide copolymers of this invention include:

1. polymers of vinyl chloride including polyvinyl chloride and the random and graft copolymers of vinyl chloride with a minor proportion of one or more of the above described group of vinyl comonomers which were listed as optional comonomers for use in preparing the crosslinked vinyl halide copolymers;

2. polymer of nitriles of ethylenically unsaturated acids including polymethacrylonitrile, polyacrylonitrile and the copolymers of methacrylonitrile or acrylonitrile with a minor proportion of one or more vinyl monomers such as the lower alkyl acrylates and methacrylates, styrene and alpha-methyl styrene;

3. polymers of methyl methacrylate including polymethyl methacrylate and copolymers of methyl methacrylate with minor proportions of one or more alpha, beta-ethylenically unsaturated monomers which are polymerizable therewith including the $C_1-C_8$ alkyl, cycloalkyl and bicycloalkyl esters of acrylic acid and the $C_2-C_8$ alkyl, cycloalkyl and bicycloalkyl esters of methacrylic acid such, for example, as ethyl acrylate and methacrylate, butyl methacrylate, 2-ethylhexyl methacrylate, norbornyl acrylate, and cyclohexyl acrylate; vinyl aryl compounds such, for example, as alpha-methyl styrene and styrene; and, nitrile of alpha, beta-ethylenically unsaturated carboxylic acids such, for example, as acrylinitrile and methacrylonitrile. From the above given group, the use of the $C_1-C_8$ alkyl estes of acrylic acid, particularly ethyl acrylate, and of the $C_{2-C8}$ alkyl esters of methacryalic acid is preferred;

4. acrylonitrile-butadiene-styrene resins, commonly referred to as "ABS" resins, which generally comprise either a mixture of a 60 to 80:40 to 20 styrene-acrylinitrile copolymer with from about 10 to 40 %, by weight, of a 5 to 40:95 to 60 acrylonitrile-butadiene copolymer or a mixture of a 60 to 80:40 to 20 styrene-acrylonitrile copolymer with from about 10 to 40%, by weight, of a graft of the latter copolymer onto polybutadiene;

5. poly(alpha-olefins) such as polypropylene and polyethylene and copolymers of one or more alpha-olefins, such as ethylene or propylene, with a minor proportion of one or more ethylenically unsaturated monomers including 4-methyl pentene-1, butene-1, norbornene and its derivatives; cyclopentadiene; cyclopentene; cyclobutene; vinyl acetate; the $C_1$–$C_{12}$ alkyl acrylate and methacrylate esters; as well as blends of the homo- and copolymers of alpha-olefins with other types of thermoplastic polymers;

6. polymers of styrene including polystyrene, poly(alpha-methyl styrene) and poly(tertiary butyl) styrene) and copolymers of styrene, alpha methyl styrene or tertiary butyl styrene with a minor proportion of one or more ethylenically unsaturated comonomers such, for example, as nitriles of ethylenically unsaturated carboxylic acids including acrylonitrile and methacrylonitrile; $C_1$–$C_{12}$ alkyl esters of acrylic and methacrylic acids such, for example, as methyl methacrylate and 2-ethylhexyl acrylate; and, graft copolymers of styrene, tertiary butyl styrene or alpha-methyl styrene with polybutadiene and other hydrocarbon elastomers;

7. cellulosic resins including cellulose esters and mixed esters such, for example, as cellulose nitrate, cellulose acetate-butyrate, cellulose acetate-propionate and cellulose ethers such, for example, as ethyl cellulose;

8. polyamide resins, i.e. the resins made by the condenstaion of di- or polyamines with di- or polybasic acids or by polymerization of lactams or amino acids. Typical polyamides include nylon 4 which is made from pyrrolidone; nylon 6 obtained by polycondensation of caprolactam; nylon 66 obtained by the condensation of hexamethylene diamine with adipic acid; nylon 610 obtained by the condensation of hexamethylenediamine with sebacic acid; nylon 7 which is a polymer of ethyl aminoheptanoate; nylon 9 made from 9-aminononanoic acid; and, nylon 11 made from 11-amino undecanoic acid;

9. polyester resins, i.e. the resins produced by the condensation of saturated or unsaturated dibasic acids, such as terephthalic, maleic, fumaric, isophthalic, adipic and azelaic acids with dihydric alcohols such as ethylene glycol, propylene glycol, diethylene glycol and dipropylene glycol. Where the resin is made with an unsaturated acid, a polymerizable monomer such, for example, as styrene, vinyl toluene, diallyl phthalate, methyl methacrylate; chlorostyrene, alpha-methyl styrene, divinyl benzene or triallyl cyanurate is often included in the composition;

10. polyurethane resins, i.e. the resins formed by the reaction between a bi- or polyfunctional hydroxyl containing compound, such as a polyether or polyester, and a di- or polyisocyanate such as toluene diisocyanate or diphenylmethane-4, 4'-diisocyanate;

11. polycarbonate resins, i.e. the resins derived from the reaction between a difunctional alcohol or phenol, such as bis-phenol A, and phosgene or an alkyl or aryl carbonate;

12. polyacetal resins, i.e. the resins derived from the anionic polymerization of formaldehyde to obtain a linear molecule of the type —O—$CH_2$—O—$CH_2$—O—$CH_2$—;

13. polyphenylene oxide resins made by the oxidative polymerization of 2,6-dimethylphenol in the presence of a copper-amaine-complex catalyst;

14. polysulfone resins, i.e. the resins containing an $SO_2$ linkage as derived from the reaction of sulfur dioxide with olefins such as 1-butene or, more preferably, by reaction of bis-phenol A with 4,4'-dichlorodiphenyl sulfone.

15. the acrylate:styrene:acrylonitrile resins, commonly referred to as "ASA" resins, which comprise copolymers containing a major proportion of a $C_2$–$C_8$ alkyl acrylate ester elastomer upon which is grafted about 65-95%, by weight, of the latter copolymer, of a 70-80:30–20 styrene:acrylonitrile copolymer.

16. the methacrylate:butadiene:styrene resins, commonly referred to as the "MBS" resins, which comprise a minor proportion of a methyl methacrylate:styrene:acrylonitrile terpolymer grafted and/or blended with either polybutadiene or a copolymer of butadiene and minor proportions of such comonomers as, for example, styrene and acrylonitrile.

In effect, one may utilize any thermoplastic polymer, i.e. any polymer that may be softened by heat and then regain its original properties on cooling, in preparing fire retardant polyblends with the novel crosslinked vinyl halide copolymer additives of this invention.

The actual blending of these crosslinked vinyl halide copolymer additives with the selected polymeric substrate, i.e. with any one or more of the above described thermoplastic polymers, may be accomplished by means of any convenient procedure which will result in an intimate admixture of the additive within the mass of the substrate polymer. Thus, for example, an aqueous suspension containing the particles of the copolymer additive may simply be blended or otherwise admixed with the substrate polymer which should, preferably, be in the form of an aqueous latex or suspension. Or, if desired, the copolymer additive and the thermoplastic polymer substrate may be admixed while each is in the form of a solid powder.

The blending operation may also be carried out by means of a procedure in which the thermoplastic polymer which comprises the substrate is itself polymerized while in the presence of an aqueous emulsion or suspension or organic solvent containing one or more of the previously prepared crosslinked copolymer additives of this invention.

With respect to proportions, the amount of crosslinked vinyl halide copolymer which may be admixed with a thermoplastic polymer substrate will depend, primarily, upon such factors as the particular crosslinked vinyl halide copolymer and thermoplastic polymer substrate which are to be blended with one another, the degree of fire retardancy desired in the resulting blend, the degree of clarity, hardness and other specific physical properties which are sought as well as other technical and economic considerations known and understood by those skilled in the art. However, in order to attain a composition which will be self-extinguishing, it is generally desirable to introduce an effective concentration of the copolymer additive which will be sufficient to provide the resulting blend with at least about 5%, by weight, of halogen, i.e. chlorine, bromine or fluorine, derived from the crosslinked vinyl halide copolymer. Thus, depending upon the concentration of the vinyl halide in the crosslinked copolymer, the polyblends containing the novel additives of this invention will contain from about 10 to 50%, by weight, of one or more of these crosslinked vinyl halide copolymers.

It is to be noted, at this point, that it is particularly surprising to find that polypropylene yields compatible polyblends with the crosslinked vinyl halide, and especially with the crosslinked vinyl chloride, copolymer additives of this invention. Thus, inasmuch as this commercially valuable polyolefin polymer cannot ordinarily be blended with conventional, i.e. uncrosslinked, polyvinyl chloride it would not, therefore, be expected that its polyblends with the additives of this invention could be easily admixed so as to yield highly compatible products in which the crosslinked copolymer additives exist in the form of distinct domains within the mass of the polypropylene substrate. Moreover, these polypropylene polyblends exhibit good fire retardancy characteristics without any significant heat degradation even at the elevated milling temperatures ordinarily employed for the milling of proppropylene.

The fire retardant polyblends of this invention can be prepared so as to contain various optional additives which may include plasticizers such as the alkyl esters of phthalic, adipic and sebacic acids such, for example, as dioctyl phthalate and ditridecyl phthalate and aryl phsophate esters such, for example, as diphenyl 2-ethylhexyl and tricresyl phosphate, etc.; lubricants and mold release agents such as stearic acid or its metal salts, petroleum based waxes, mineral oils, polyethylene waxes, etc.; and heat and light stabilizers such as barium, cadmium, calcium or zinc soaps and phenates, basic lead compounds, organo-tin compounds such as dialkyl tin mercaptides and dialkyltin maleates, thiolauric anhydride and n-butyl stannoic acid, epoxidized oils, alkyl diphenyl phosphites, triaryl phosphites, phenyl salicylates, benzophenones and benzotriazoles, etc. For a more complete listing of plasticizers, lubricants, stabilizers and other functional additives, one may consult "Polyvinyl Chloride" by H. A. Sarvetnick published by Van Nostrand Reinhold Co., New York, N.Y., in 1969.

These polyblends may also contain fillers, pigments, dyes, opacifying agents, decorative additives such as reflective metal foils or flakes, and other imbedded spolid objects such as fiber glass, textile fibers, asbestos, paper, and the like, provided that they do not detract from the flame retardancy of these products. In addition, the compositions may contain other flame retardants such as antimony compounds, chlorinated paraffins, perchlorinated alicyclic compounds, bromine containing organic compounds, halogenated alkyl phosphates or phosphonates, alkyl acid phosphates, or small concentrations of phosphoric acid. Thus, it may be noted, at this point, that the fire retardancy of the novel polyblends of this invention can be still further improved by the addition of concentrations of antimony trioxide which are substantially below those normally utilized when this costly additive is used by itself as a fire retardant additive for burning thermoplastics.

The novel polyblends of this invention, comprising blends of any of the above described thermoplastic polymers with one or more of the crosslinked vinyl halide copolymer additives of this invention, may be utilized in any of the coating, impregnating and especially in the molding applications known to those skilled in the art wherein it is desired to provide fire retardancy to the resulting end product. For example, these compositions may be used for preparing such diverse items as calendered films, blow molded bottles, extruded and blown films, extruded and shaped articles such as panels, tubes, sheets, rods, fibers and particularly with polypropylene and other polyolefin fibers, and in carrying out such processes as injection molding, fluidized bed coating, electrostatic powder spraying and rotational coating, etc. More particularly, those polyblends which are optically clear such, for example, as those based upon homo- or copolymers of methyl methacrylate or homo- or copolymers of styrene may be utilized for preparing such articles as lenses, aircraft canopies, windows, windshields, lighting fixtures and advertising displays. Applications wherein optical clarity is not essential include such automotive applications as seat backs, door panels, instrument panels, head rests, arm rests, package shelves, plated hardware, radiator grills, fender extensions and liners, wheel covers and gas tanks. Non-automotive applications include their use as structural and decorative components for both the interiors and exteriors of conventional houses and mobile homes and as structural and decorative elements of business machines and electrical appliances.

In addition to being used as fire retardant additives for the preparation of fire retardant polyblends with burning thermoplastics, the crosslinked vinyl halide copolymer additives of this invention may be used, per se, in any of the various coating, adhesive, laminating, impregnating and molding applications known to those skilled in the art. Thus, they may be coated upon and/or absorbed by all types of substrates to which it is desired to impart fire retardant properties. They may, therefore, be used as coatings, impregnants, fillers, laminants, and adhesives for such substrates as wood; paper; metals; textiles based on either natural or synthetic fibers or blends thereof; synthetic polymer films such as those based upon polyolefins, regenerated cellulose, i.e. cellophane, polyvinyl chloride, polyesters and the like; leather; natural and synthetic rubber; fiberboard; and synthetic plastics prepared by means of either addition or condensation polymerization techniques.

The following examples will further illustrate the embodiment of this invention. In these examples, all parts given are by weight unless otherwise noted.

EXAMPLE 1

This example illustrates the preparation of a crosslinked vinyl halide copolymer additive and its use in the preparation of a fire retardant polyblend with polypropylene.

Ninety parts of vinyl chloride and ten parts of allyl methacrylate are suspension polymerized in a solution of 0.5 parts of methyl cellulose in 300 parts of deionized water which also contains 0.5 parts of t-butyl peroxypivalate as an initiator. The latter mixture is stirred at 60° C. for 10 hours while in a nitrogen atmosphere. The resulting crosslinked 90:10 vinyl chloride-allyl methacrylate copolymer is isolated by filtration followed by washing with water and drying at 70° C. for 24 hours. The copolymer is obtained in a yield of 98% and contains 50%, by weight, or chlorine.

A polyblend containing polypropylene along with 30%, by weight, of the above described crosslinked copolymer is prepared by milling a mixture of those two resins for 10 minutes on a two-roll mill in which the front roll is at a temperature of 185° C. and the back roll is at 130° C. As shown in the following table, the resulting blend, as compared with unmodified polypropylene, displays reduced flammability upon having its limiting oxygen index (LOI) determined by means of ASTM D-2863; the latter procedure also being described by Fenimore and Martin in the November, 1966, issue of Modern Plastics. In brief, this procedure directly relates flame retardancy to a measurement of the minimum percentage concentration of oxygen in a oxygen:nitrogen mixture which permits the sample to burn; the LOI being calculated as follows:

$$LOI = \frac{[O_2]}{[O_2] + [N_2]} \times 100$$

Thus, a higher LOI is indicative of a higher degree of flame retardancy.

| FLAMMABILITY OF POLYPROPYLENE POLYBLENDS | |
|---|---|
| Polyblend Composition (Parts crosslinked copolymer/pts. polypropylene) | L.O.I. Value |
| 0/100 | 17.6 |
| 30/100 | 21.5 |
| 30/100 + 6% of antimony trioxide as based on the weight of the polypropylene | 23.8 |

The above data reveal the improved fire retardancy of the polyblends of this invention as well as the fact that the use of a relatively low concentration of antimony trioxide in combination with the fire retardant crosslinked copolymer additive of this invention affects an additional increase in the fire retardancy displayed by one of the novel polyblends of this invention.

Comparable fire retardant polyblends are obtained upon blending this crosslinked copolymer additive with various burning thermoplastics including polymethyl methacrylate, polystyrene, polyethylene, cellulose acetate, nylon 66, polyphenylene oxide, polycarbonate and polyurethane resins. Moreover, excellent fire retardant polyblends are also provided by the use of the following crosslinked vinyl halide copolymers:

1. A 95:5 vinyl chloride-allyl methacrylate copolymer;
2. A 45:45:10 vinyl chloride:vinyl bromide:allyl methacrylate copolymer;
3. A 90:10 vinyl chloride:ethylene glycol dimethacrylate copolymer;
4. A 95:5 vinyl chloride:2-vinyloxyethyl ether copolymer;
5. A 90:5:5 vinyl bromide-allyl methacrylate copolymer: vinylidene chloride copolymer;
6. An 80:20 vinyl chloride-ethyl diallylphosphonate copolymer.

EXAMPLE 2

This example illustrates the preparation of another of the crosslinked vinyl halide copolymer additives of this invention as well as its use in the preparation of a fire retardant polyblend with an ABS resin.

Ninety-five parts of vinyl chloride and five parts of allyl methacrylate are suspension polymerized in a solution of 0.5 parts of methyl cellulose in 300 parts of deionized water which also contains 0.5 parts of t-butyl peroxypivalate as an initiator. The latter mixture is stirred at 60° C. for 10 hours while in a nitrogen atmosphere. The resulting crosslinked 95:5 vinyl chloride:allyl methacrylate copolymer is isolated by filtration followed by washing with water and drying at 70° C. for 24 hours. The copolymer is obtained in a yield of 98% and contains 50%, by weight, of chlorine.

A polyblend containing 70 parts of an ABS resin sold by the Marbon Chemical Division of the Borg-Warner Corp. as "Blendex-311" along with 22 parts of the above described cross-linked copolymer and 8 parts of antimony trioxide is prepared by milling a mixture of the latter ingredients for 10 minutes on a two-roll mill in which the front roll is at a temperature of 330° F. and the back roll is at 310° F. As shown in the following table, the resulting blend, as compared with unmodified ABS resin, displays reduced flammability upon having its limiting oxygen index (LOI) determined by means of ASTM D-2863.

| FLAMMABILITY OF ABS RESIN POLYBLEND | |
|---|---|
| Polyblend Composition (parts crosslinked copolymer/parts ABS resin) | L.O.I. Value |
| 0/100 | 17.8 |
| 22/70 + 8 parts of antimony trioxide and 0.6 parts of a tin mercaptide stabilizer sold by M & T Chemicals, Inc. as "Thermolite 31" | 24.4 |

The above data again illustrates the improved fire retardancy developed in the polyblends containing the novel cross-linked copolymer additives of this invention.

EXAMPLE 3

This example illustrates the preparation of a cross-linked vinyl chloride copolymer by suspension polymerization method.

A mixture of 95 parts of vinyl chloride and 5 parts of diallylphthalate is suspension polymerized in a solution of 0.5 parts of methyl cellulose suspension agent in 300 parts of deionized distilled water which also contains 0.45 parts of t-butyl peroxypivalate as an initiator. This mixture is stirred at 60° C. for 15 hours. The resulting crosslinked copolymer of 95:5 vinyl chloride:diallyl phthalate is isolated by filtration followed by washing with water and drying at 50° C. overnight. The copolymer is obtained in a yield of 96%. This copolymer would not burn in air.

EXAMPLE 4

This example illustrates the preparation of crosslinked vinyl chloride copolymer using diallyl adipate as a crosslinking agent.

A mixture of 95 parts of vinyl chloride and 5 parts of diallyl adipate is suspension polymerized in a mixture of 0.5 parts of methyl cellulose and 0.45 parts of t-butyl peroxypivalate in 300 parts of deionized distilled water. The mixture is stirred at 60° C. for 15 hours. The resulting copolymers are isolated and dried by the same procedure described in Example 1. Ninety-five grams of copolymer were recovered.

This polymer did not burn in air.

EXAMPLE 5

This example illustrates the preparation of a crosslinked copolymer of 90:10 vinyl chloride : ethylene glycol dimethacrylate.

A mixture of 90 parts of vinyl chloride and 10 parts of ethylene glycol dimethacrylate was suspension copolymerized in a mixture of 0.5 parts of methylcellulose and 0.45 parts of t-butyl peroxypivalate in 300 parts of deionized distilled water. This mixture is stirred at 60° C. for 10 hours. The copolymers obtained are isolated and dried by the same procedure described in the previous example. Ninety-four grams of free flowing powders were obtained. This copolymer would not burn in air.

EXAMPLE 6

This example illustrates the preparation of a crosslinked polymer of 50:45:5 vinyl bromide : vinyl chloride : triallyl phosphate by suspension polymerization method.

A mixture of 50 parts of vinyl bromide. 45 parts of vinyl chloride, and 5 parts of triallyl phosphate is suspension polymerized in a mixture of 1 part of sodium carbonate, 0.7 parts of methylcellulose and 1.2 parts of diisopropyl peroxydicarbonate in 300 parts of deionized distilled water. The latter mixture is stirred at 50° C. for 10 hours. The resulting polymers are isolated by filtration followed by washing with water and drying at 45° C. for 20 hours. Ninety-four parts of free flowing powder was obtained. This polymer was found to contain 35% bromine and 25.5% chlorine. The thus prepared polymer would not burn in air and could not be ignited.

EXAMPLE 7

This example illustrated the preparation of a crosslinked vinyl bromide and vinyl chloride copolymer by suspension method.

A mixture of 50 parts of vinyl bromide, 45 parts of vinyl chloride, and parts of triallyl cyanurate is suspension polymerized in a reaction medium of a mixture of 0.5 parts of sodium carbonate, 0.5 parts of methyl cellulose, 1.2 parts of diisopropyl peroxydicarbonate in 300 parts of deionized distilled water. The later mixture is stirred at 50° C. for 10 hours. The weight of washed and dried powder was 94 grams. This polymer was found to contain 38.2% bromine and 24.3% chlorine. This composition will not burn in air and cannot be ignited.

EXAMPLE 8

This example illustrates the preparation of a crosslinked vinyl chloride copolymer by emulsion polymerization method.

A mixture of 90 parts of vinyl chloride and 10 parts of diallyl phthalate is emulsion polymerized in a mixture of 0.5 parts of sodium carbonate, 1.5 parts of sodium lauryl sulfate, and 0.5 parts of ammonium persulfate in 200 parts of deionized distilled water. The latter mixture is stirred slowly at 58° C. for 9 hours to produce a stable latex. The latex was dried on a tray at 50° C. The weight of dried polymer was 96 grams. This polymer did not burn in air.

EXAMPLE 9

This example illustrates the preparation of a crosslinked vinyl chloride copolymer by emulsion polymerization method.

A mixture of 95 parts of vinyl chloride and 5 parts of diallyl adipate is emulsion polymerized in a mixture of 0.5 parts of sodium carbonate, 1.5 parts of sodium lauryl sulfate, and 0.5 parts of ammonium persulfate in 200 parts of deionized distilled water. The mixture is slowly stirred at 58° C. for 9 hours resulting in a stable latex. The weight of polymer obtained was 96 grams. The polymer was found to contain 49.3% chlorine. The polymer will not burn in air and cannot be ignited.

EXAMPLE 10

This example illustrates the preparation of a copolymer of 95:5 vinyl chloride : diallyl fumarate by emulsion method. A mixture of 95:5 vinyl chloride : diallyl fumarate is emulsion polymerized in a mixture of 0.5 parts of sodium carbonate, 1.5 parts of sodium lauryl sulfate, and 0.5 parts of ammonium persulfate in 200 parts of deionized distilled water. The mixture is slowly stirred at 58° C. for 9 hours. A stable latex of 95:5 vinyl chloride: diallyl fumarate copolymer is obtained almost in quantitative yield. The thus obtained polymer will not burn in air.

EXAMPLE 11

This example illustrates the preparation of a crosslinked copolymer of 95:5 vinyl chloride : diallyl chloromethyl phosphonate by suspension method.

A mixture of 95 parts of vinyl chloride and 5 parts of diallyl chloromethylphosphonate was suspension polymerized in a mixture of 0.5 parts of methyl cellulose, 0.5 parts of sodium carbonate, and 0.6 parts of t-butyl peroxypivalate in 300 parts of deionized distilled water. The latter mixture is stirred at 60° C. for 12 hours. The polymer formed is isolated by filtration followed by washing with water and drying at 50° C. overnight. The weight of recovered polymer was 90 grams. This polymer will not burn in air and cannot be ignited.

EXAMPLE 12

A crosslinked copolymer of 95:5 vinyl chloride : diallyl phenylphosphonate is prepared by suspension method following the same procedure described in Example 11. Ninety-six grams of polymer were obtained. This polymer does not burn in air and cannot be ignited.

EXAMPLE 13

This example illustrates the preparation of a crosslinked vinyl halide copolymer and its use in the preparation of curable unsaturated polyester resin with reduced flammability.

Sixty parts of vinyl chloride, 30 parts of bis ($\beta$-chloroethyl) vinyl phosphonate, and 10 parts of allyl methacrylate are emulsion polymerized in a solution containing 2.5 parts of sodium lauryl sulfate, 0.7 parts of ammonium persulfate, 1.0 part of sodium carbonate in 250 parts of deionized distilled water. This mixture is stirred at 60° C. for 8 hours. The resulting latex of crosslinked copolymer was tray-dried at 50° C. overnight. The copolymer contained 3.96% phosphorus and 39.9% chlorine. The tray-dried copolymer was ground, using a Waring blender, to fine particles. Five parts of this copolymer were mixed with 100 parts of chlorendic anhydride based styrene containing unsaturated polyester resin, Hooker Chemical Company's Hetron 24370. This mixture was cured using benzoyl peroxide/-dimethyl aniline at room temperature.

The flame retardancy and physical properties of this composition is given in the following table, which shows the efficacy of the crosslinked copolymer composition as a flame retardant additive.

|  | Control | Experimental Composition |
|---|---|---|
| Additive Level (parts per hour) | 0 | 5 |
| Flammability |  |  |

| | Control | Experimental Composition |
|---|---|---|
| (HLT Rating)[1] | 40 | 68 |
| Barcol Hardness[2] | 55 | 60 |
| Flexural Strength (psi) | 34,500 | 30,900 |

[1]Hooker Laboratory Test Rating - See Hilado, Flammability Handbook for Plastics, p. 164 (Technomic - 1969).
[2]ASTM D 20, Sub. 1 Sec. Q, American Society for Testing and Materials, Philadelphia. April 1966.

EXAMPLE 14

This example illustrates the preparation of 60:30:10 vinyl chloride:bis(beta-chloroethyl)vinyl-phosphonate:allyl methacrylate copolymers by means of emulsion polymerization procedure.

A mixture of 70 parts of vinyl chloride, 20 parts of bis(beta-chloroethyl) vinylphosphonate and 10 parts of allyl methacrylate was polymerized in a solution of 3 parts of sodium lauryl sulfate, 0.7 parts of ammonium persulfate, and 0.2 parts of sodium bicarbonate in 246 parts of deionized distilled water. This mixture was polymerized at 50° C. for 8 hours with slow agitation. A stable latex of a crosslinked copolymer was obtained with almost quantitative conversion. The thus prepared polymer would not burn in air and could not be ignited by match or oxygen-methane gas torch.

EXAMPLE 15

This example illustrates the possibility of using different multifunctional crosslinking agent for the preparation of same type compositions.

In this experiment diallyl adipate was used to make crosslinked copolymer of 70:20:10 vinyl chloride:bis(beta chloroethyl) vinylphosphonate:diallyl adipate. A mixture of vinyl chloride, bis(beta chloroethyl)vinyl phosphonate, and diallyl adipate was emulsion polymerized in the presence of a solution of 0.7 parts of ammonium persulfate, 0.2 parts of sodium bicarbonate, 3 parts of sodium lauryl sulfate in 246 parts of deionized distilled water. The mixture is stirred at 50° C. for 8 hours. A stable latex of the crosslinked composition is obtaine, which would not burn in air, and could not be ignited by match or oxygen-methane gas torch.

EXAMPLE 16

This example illustrates the preparation of a crosslinked copolymer by suspension method. A mixture of 40 parts of vinyl chloride, 40 parts bis(beta chloroethyl) vinyl phosphonate, and 20 parts of allyl methacrylate is suspension polymerized in a mixture of 1.5 parts of t-butyl peroxypivalate and 0.5 parts of methyl cellulose in 300 parts of deionized distilled water. This mixture is stirred at 60° C. for 12 hours. The weight of recovered resin is 90.5 g, which would not burn in air, and could not be ignited by match or oxygen-methane gas torch.

EXAMPLE 17

This example illustrates a suspension polymerization of a crosslinked copolymer composition.

A mixture of 60 parts of vinyl chloride, 30 parts of bis(beta chloroethyl) vinyl phosphonate, and 10 parts of allyl methacrylate is polymerized in a mixture of 1.5 parts of t-butyl peroxypivalate, 0.5 parts of methyl cellulose in 300 parts of deionized distilled water. This mixture is stirred at 60° C. for 12 hours. Fine powders of the crosslinked copolymer are obtained in almost quantitative yield. The dried polymer was found to contain 3.7% phosphorus and 42.8% chlorine, and would not burn in air, nor could it be ignited by match or oxygenmethane gas torch.

EXAMPLE 18

This example illustrates the preparation of crosslinked vinyl bromide copolymers.

A mixture of 60 parts of vinyl bromide, 30 parts of bis(beta chloroethyl) vinyl phosphonate, and 10 parts of allyl methacrylate is suspension polymerized in a mixture of 1.5 parts of t-butyl peroxypivalate, 0.5 parts of methyl cellulose, and 0.5 parts of sodium bicarbonate in 300 parts of deionized distilled water.

The mixture is stirred at 60° C. for 12 hours. Fine powders of the crosslinked polymer are obtained, which would not burn in air, nor be ignited by match or oxygen-methane gas torch.

EXAMPLE 19

This experiment shows another example of preparation of emulsion product of the crosslinked copolymers.

A mixture of 50 parts of vinyl chloride, 40 parts of bis(beta chloroethyl) vinyl phosphonate, and 10 parts of allyl methacrylate is polymerized in a mixture of 1.0 part of ammonium persulfate, 2.5 parts of sodium lauryl sulfate, 2 parts of polyvinyl alcohol, and 0.2 parts of sodium bicarbonate in 50 parts of deionized distilled water.

This mixture is stirred at 60° C. for 10 hours. A good milky latex is obtained. Dried polymer showed 3.9% loss by weight when it was subjected to tetrahydrofuran soxhlet extraction for 12 hours. The resultant polymer would not burn in air, and could not be ignited by match or oxygen-methane gas torch.

EXAMPLE 20

This example illustrates a preparation of a crosslinked copolymer composition and its use as flame retardant additive in flexible polyurethane foam resin.

A mixture of 69 parts vinyl chloride, 30 parts of bis(beta chloroethyl) vinyl phosphonate, and 1 part of allyl methacrylate is suspension copolymerized in a mixture of 4.0 parts of 30 wt. % hexane solution of diisopropyl peroxydicarbonate and 2.5 parts of methyl cellulose in 350 parts of deionized distilled water. The mixture is stirred at 50° C. for 12 hours.

The polymers recovered were dried at 50° C. overnight. About 90 wt. % conversion was resulted.

This resin (15 parts) was mixed with 7 parts of aluminum oxide hydrate, 3 parts of antimony oxide in 100 parts of polyol CP 3720. Flexible polyurethane foams made with this mixture showed good flame retardancy by MVSS 302 Flammability Test.[3]

[3]Motor Vehicle Safety Standard No. 302. See *Federal Register,* Vol. 36, No. 5, p. 290 (Jan. 8, 1971).

EXAMPLE 21

This example illustrates the preparation of a crosslinked copolymer composition and its use as flame retardant in flexible polyurethane foam resin.

The mixture of 89 parts of vinyl chloride, 10 parts of bis(beta chlorethyl) vinyl phosphonate, and 1 part of diallyl phthalate is polymerized as described in Example 20. Almost quantitative conversion resulted. This resin was mixed with aluminum oxide hydrate, and antimony oxide, in polyol. Then, flexible polyurethane foam was prepared as described in Example VIII. The foams thus prepared showed good flame retardancy by MVSS 302 Test.

Variations may be made in proportions, procedures and materials without departing from the scope of this invention as defined in the following claims.

What is claimed is:

1. A fire retardant polyblend comprising an intimate admixture of at least one polyurethane resin; and an effective flame retarding concentration of at least one crosslinked copolymer of: (1) at least one vinyl halide selected from the group consisting of vinyl chloride, vinyl bromide and vinyl fluoride present in a concentration of from 50–99% by weight and (2) at least one polyfunctional ethylenically unsaturated monomer, present in a concentration of from about 1–50% by weight.

2. The polyblend of claim 1, wherein the polyfunctional ethylenically unsaturated monomer of said crosslinked copolymer is selected from the group consisting of allyl methacrylate, divinyl benzene, ethylene glycol dimethacrylate, trimethylolpropane trimethacrylate, methylene-bis-acrylamide, diethylene glycol diacrylate, ethylene glycol diacrylate, divinyl ether, diallyl adipate, 2-vinyloxyethyl ether, diallyl fumarate, diallyl phthalate, divinyl sulfone, divinyl carbitol, butylene dimethacrylate, trimethylene glycol diacrylate, butylene glycol diacrylate, pentamethylene glycol diacrylate, glyceryl triacrylate, octylene glycol diacrylate, trimethylene propane triacrylate, the tetraacrylte ester of pentaerythritol and ethyl diallylphosphonate.

3. The polyblend of claim 2, wherein the polyfunctional ethylenically unsaturated monomer of said crosslinked copolymer is allyl methacrylate.

4. The polyblend of claim 1, wherein the vinyl halide of said crosslinked copolymer is vinyl chloride.

5. The polyblend of claim 1, wherein said crosslinked copolymer also contains up to about 49%, by weight, of at least one optional monofunctional vinyl comonomer.

6. The polyblend of claim 1, wherein said crosslinked vinyl halide copolymer is present in a concentration of from about 5 to 50% of the total weight of said polyblend.

7. The polyblend of claim 1 wherein antimony trioxide is also present.

8. A fire retardant polyblend comprising an intimate admixture of at least one polyurethane resin; and an effective flame retarding concentration of a crosslinked copolymer of from about 50–99% by weight, of vinyl chloride and from about 1–50%, by weight of a polyfunctional ethylenically unsaturated monomer.

9. The polyblend of claim 8, wherein the polyfunctional ethylenically unsaturated monomer of said crosslinked copolymer is selected from the group consisting of allyl methacrylate, divinyl benzene, ethylene glycol dimethacrylate, trimethylolpropane trimethacrylate, methylene-bis-acrylamide, diethylene glycol diacrylate, ethylene glycol diacrylate, divinyl ether, diallyl adipate, 2-vinyl oxyethyl ether, diallyl fumarate, diallyl phthalate, divinyl sulfone, divinyl carbitol, butylene dimethacrylate, trimethylene glycol diacrylate, butylene glycol diacrylate, pentamethylene glycol diacrylate, glyceryl triacrylate, octylene glycol diacrylate, trimethylene propane triacrylate, the tetraacrylate ester of pentaerythritol and ethyl diallylphosphonate.

10. The polymer composition of claim 8, wherein the polyfunctional ethylenically unsaturated monomer of said crosslinked vinyl chloride copolymer is allyl methacrylate.

11. The polymer composition of claim 9, wherein said crosslinked vinyl chloride copolymer also contains up to about 49%, by weight of at least one optional monofunctional vinyl comonomer.

12. The polyblend of claim 8, wherein said crosslinked vinyl chloride copolymer is present in a concentration of from about 5 to 50%, of the total weight of said polyblend.

13. The polyblend of claim 8, wherein antimony trioxide is also present.

* * * * *